United States Patent
Wilson et al.

(10) Patent No.: US 7,032,328 B2
(45) Date of Patent: Apr. 25, 2006

(54) MULTI-LAYER HONEYCOMB SOLE

(75) Inventors: Susan Wilson, San Jose, CA (US);
Curtis L. Landi, San Jose, CA (US);
Karl Boucher, Foster, CA (US)

(73) Assignee: Supracor, Inc., San Jose, CA (US)

( * ) Notice: Subject to any disclaimer, the term of this patent is extended or adjusted under 35 U.S.C. 154(b) by 205 days.

(21) Appl. No.: 10/761,930

(22) Filed: Jan. 20, 2004

(65) Prior Publication Data

US 2005/0155255 A1 Jul. 21, 2005

(51) Int. Cl.
*A43B 13/20* (2006.01)
*A43B 3/12* (2006.01)

(52) U.S. Cl. .......................................... 36/29; 36/11.5
(58) Field of Classification Search .................... 36/29, 36/35 B, 44, 11.5
See application file for complete search history.

(56) References Cited

U.S. PATENT DOCUMENTS

| | | | | |
|---|---|---|---|---|
| 532,429 | A | * | 1/1895 | Rogers .......................... 36/28 |
| 2,432,533 | A | * | 12/1947 | Margolin ....................... 36/3 B |
| 3,018,205 | A | * | 1/1962 | Jacques ........................ 428/116 |
| D237,323 | S | * | 10/1975 | Inohara et al. ............... D2/954 |
| D248,897 | S | * | 8/1978 | Toothaker .................... D2/958 |
| 4,485,568 | A | * | 12/1984 | Landi et al. .................. 36/44 |
| 5,134,790 | A | * | 8/1992 | Woitschaetzke et al. ....... 36/28 |
| 5,381,607 | A | * | 1/1995 | Sussmann ...................... 36/28 |
| 6,178,662 | B1 | * | 1/2001 | Legatzke ...................... 36/3 R |
| 2004/0031170 | A1 | * | 2/2004 | Chi .............................. 36/29 |

FOREIGN PATENT DOCUMENTS

FR 2800581 A1 * 5/2001
JP 08318585 A * 12/1996

* cited by examiner

*Primary Examiner*—Ted Kavanaugh
(74) *Attorney, Agent, or Firm*—Buchanan Ingersoll, P.C.

(57) ABSTRACT

Methods and apparatus directed to a multi-layer honeycomb sole. A footwear item in accordance with the invention includes a sole that includes a top layer attached to a bottom layer such that their edges are fused together. The top layer includes a first honeycomb core having an exposed surface that includes contours configured to accommodate contours of a foot. The first honeycomb core includes unsealed cells that have walls with perforations. The bottom layer includes a second honeycomb core that includes sealed cells.

9 Claims, 12 Drawing Sheets

MULTI-LAYER HONEYCOMB SOLE

BACKGROUND

The present invention relates to footwear.

There are different types of footwear, examples of which include but are not limited to walking shoes, tennis shoes, running shoes, bicycle shoes, basketball shoes, hiking boots, ski boots, snow boarding boots, snow shoes, and sandals. Different types of footwear may include different components. Bicycle shoes, for example, include clips configure to detachably attach the shoes to the pedals of a bicycle. Regardless of the type, however, footwear usually includes a sole, which can provide cushioning as well as protection.

SUMMARY

The present inventions provides footwear that includes a multi-layer honeycomb sole.

In general, in one aspect, the invention provides a footwear item that includes a sole that includes a top layer attached to a bottom layer such that their edges are fused together. The top layer includes a first honeycomb core having an exposed surface that includes contours configured to accommodate contours of a foot. The first honeycomb core includes unsealed cells that have walls with perforations. The bottom layer includes a second honeycomb core that includes sealed cells.

In general, in another aspect, the invention provides a sandal having a sole that includes a bottom layer that includes a first honeycomb core, a first thermoplastic sheet bonded to a top surface of the first honeycomb core, and a second thermoplastic sheet bonded to a bottom surface of the first honeycomb core. The cells of the first honeycomb core are sealed by the first and second thermoplastic sheets to trap fluid within each cell. The sole includes a top layer that includes a second honeycomb core that includes an exposed surface that is contoured according to contours of a foot. The second honeycomb core includes cells that are not sealed and, furthermore, having walls with perforations such that fluids can be expelled from the cells when the sandal is subject to a compressive force applied at the exposed surface. The top and bottom layer are attached such that their edges are fused together.

In general, in another aspect, the invention provides a method for making a multi-layer honeycomb sole. The method includes bonding a first facing sheet to a bottom surface of a first sheet of honeycomb core. The method includes bonding a second facing sheet to a top surface of the first sheet of honeycomb core, the bonding resulting in a bonded first sheet of honeycomb core. The method includes heating a bottom surface of a second sheet of honeycomb core, the second sheet of honeycomb having a top surface. The method includes, while the bottom surface of the second sheet of honeycomb core and the second facing sheet bonded to the first honeycomb core are still a temperature at which they can bond, placing the bottom surface of the second sheet of honeycomb core in contact with the second facing sheet, and use a male mold to press together the second sheet of honeycomb core and the bonded first sheet of honeycomb core. The male mold is shaped like a sole of a foot. The pressing forms contours on the top surface of the second sheet of honeycomb.

The invention can be implemented to realize one or more of the following advantages. An item of footwear in accordance with the invention provides effective support for the wearer's feet, enhances circulation, and stimulates the wearer's sole. The item is light weight yet provides effective support. The item can include one or more features that expel trapped liquid and moisture and, furthermore, deter bacterial, fungal, and mildew growth. The item advantageously can be worn during activities or in environments in which it is likely to get wet.

A sole in accordance with the invention has high tear and tensile strength and is highly resilient, with optimal compression load and shock absorption or dispersion characteristics, yet is extremely lightweight. The sole can absorb and spread the forces from high impact areas to lower impact areas. For example, while walking or running, the heal and metatarsal portions of the foot typically bear the brunt of the impact load. The sole can absorb a substantial portion of such impact load, and disperse the forces more evenly along the entire bottom surface of the foot.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
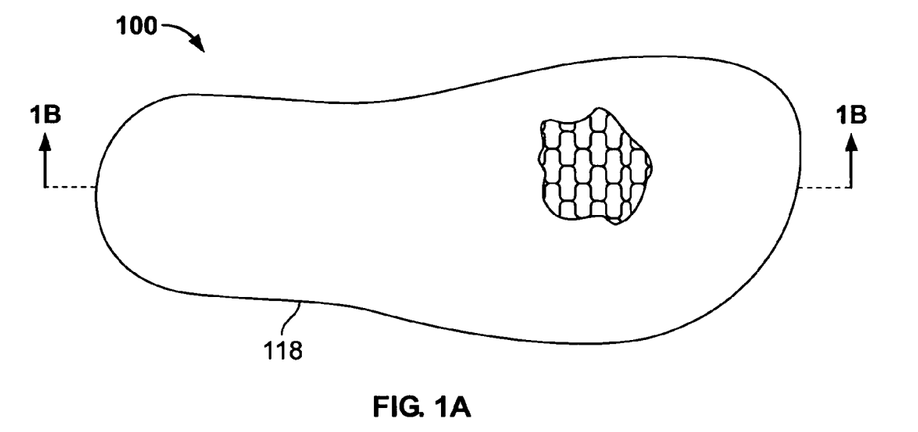
FIGS. 1A and 1B show a sole in accordance with the invention.
Figure 1B:
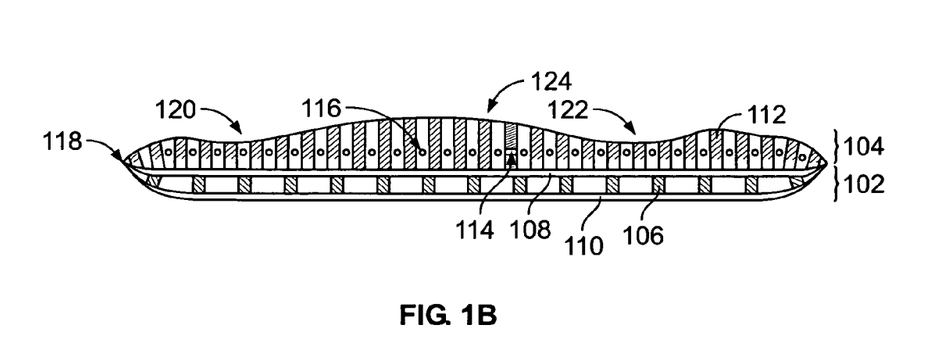

A footwear item in accordance with the invention includes a sole having a plurality of layers, at least two of which include a honeycomb core. FIGS. 1A and 1B show a multi-layer sole 100 in accordance with the invention. The sole 100 includes at least a bottom layer 102 and a top layer 104. The bottom layer 102 includes a honeycomb core 106, which is constructed from a plurality of resilient thermoplastic ribbons intermittently bonded and then expanded to form a network of cells. The honeycomb core is further described below. Cells of the honeycomb core 106 of the bottom layer 102 are sealed so as to trap air or other fluids (e.g., refrigerant or fluids that provides heat) within the cells. Cells walls of the honeycomb core 106 of the bottom layer 102 can include perforations through which fluids can be pumped from cells in the heel region of the sole to cell in the metatarsal region of the sole as the wearer walks. The movement of fluids can provide a cushioning effect. The cells can be sealed by, for example, bonding thermoplastic or facing sheets 108 and 110 to the top and bottom surfaces of the honeycomb core 106. The top layer 104 also includes a honeycomb core 112. Like the honeycomb core 106 of the bottom layer 102, the honeycomb core 112 of the top layer 104 is constructed from a plurality of resilient thermoplastic ribbons intermittently bonded and then expanded to form a network of cells. However, unlike cells of the honeycomb 106 of the bottom layer 102, cells of the honeycomb 112 of the top layer 104 are left unsealed. Furthermore, cell walls of the honeycomb core 112 of the top layer 104 can include perforations, for example, perforations 114 and 116, through which fluids can be communicated between or among cells. The perforations and the process for making them are similar to those described in commonly owned U.S. Pat. No. 5,180,619 to Landi et al., which issued on Jan. 19, 1993, and which is hereby incorporated by reference. The exposed cells and perforations provide a mechanism through which a compressive force, for example, the weight of a wearer, expels fluids from the honeycomb core. The exposed surface of the top layer includes contours to accommodate the anatomy of a foot. The exposed surface, for example, can include concave contours in the heel and metatarsal portions 120 and 122, respectively, as well as a convex contour in the arch portion 124. The outer edge 118 of the sole is sealed by, for example, fusing together the outer edges of the layers of the sole, including the bottom layer 102 and the top layer 104, to trap air in cells around the periphery of the sole and, furthermore, to give the sole a more finished appearance. The exposed (i.e., bottom) surface of the bottom layer can be contoured to provide traction.

Figure 2A:
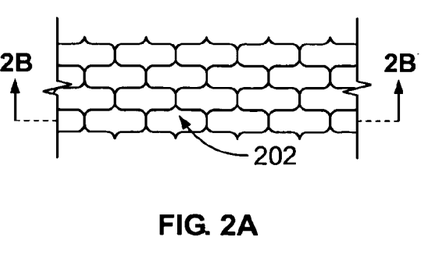
FIGS. 2A–2C show an example of a honeycomb core.
Figure 2B:
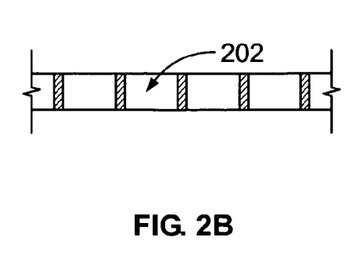
Figure 2C:
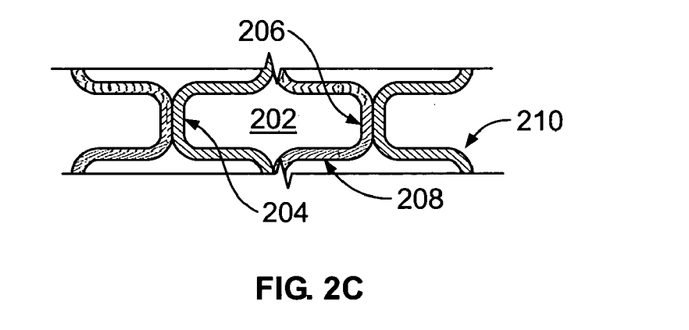
Figure 3:
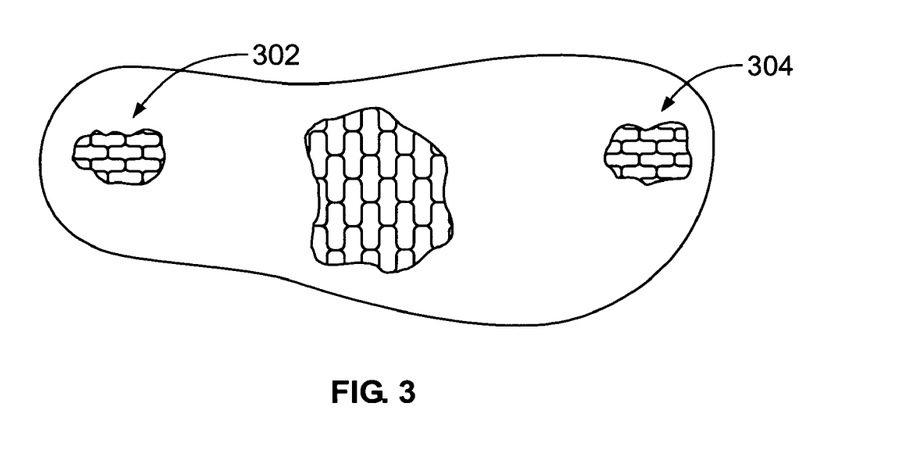
FIG. 3 shows another example of a honeycomb core.

FIGS. 2A and 2B show an example of a honeycomb core. The cells, for example cell 202, are generally hexagonal in shape. Alternatively, the cells can have other shapes, for example, square shape, triangle shape, circle shape, and oval shape. The cells are approximately one quarter of an inch in diameter. Alternatively, the cells can be of any dimension as long as there are enough of them per unit area so that they provide adequate support for the wearer's weight. The cells typically include side walls, e.g., walls 204 and 206 of FIG. 2C, that are thicker than their other side walls. The thick side walls are usually made from two ribbons. For example, side wall 206 of cell 202 is made from ribbons 208 and 210. The honeycomb cores of the first and second layers can be different in one or more aspects. For example, the cells of the bottom layer can have a shape that is different from the shapes of cells of the top layer. The cells of the bottom layer can have dimensions that are different from the dimensions of cells of the top layer. The cells of the bottom layer can be oriented differently than are the cells of the top layer. Moreover, the honeycomb core of a given layer can include cells of different designs and/or structures. For example, the honeycomb core shown in FIG. 3 includes cells having a first size and cells having a second size that is different from the first size. Portions of the core likely to bear more of a wearer's weight, for example, the heel and metatarsal portions 302 and 304, can include cells of smaller dimensions so that there are more cells per unit area in these portions.

Figure 4:
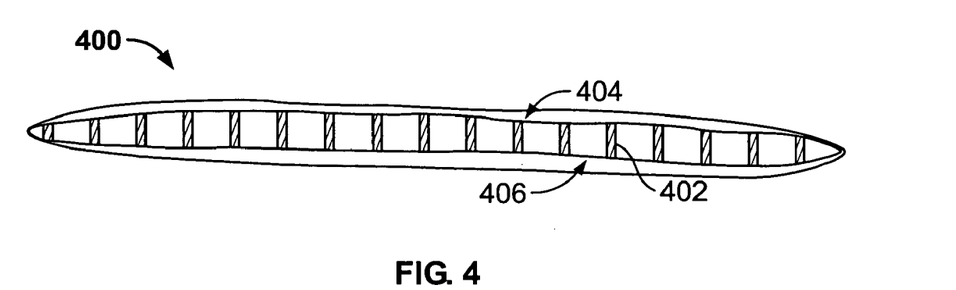
FIG. 4 shows an implementation of the bottom layer of the sole.

FIG. 4 shows one embodiment 400 of a bottom layer 102. The bottom layer shown includes a honeycomb core 402 and two facing sheets 404 and 406. The facing sheets 404. and 406 are bonded to the top and bottom surfaces of the ribbons of the honeycomb core 402. The bottom surface 406 is the bottom of the sole. The honeycomb core 402 is made of 0.012 inch thick core ribbon stock intermittently bonded and expanded to form undulated strips of material that form the honeycomb structure having a plurality of cells. The ribbon stock is 85 shore A durometer. The cell diameters are approximately ⅜ inches. The facing sheets 404 and 406 are approximately 0.02 inch thick 90 Shore A plastic material. Cells of the honeycomb core are hermetically sealed, in which trapped air compresses upon cell deformation to provide additional compressive absorption. The honeycomb core 402 and thermoplastic sheets 404 and 406 are similar in type and manufacture to those described in commonly assigned U.S. Pat. No. 5,039,567 to Landi et al. ("the '567 patent"), which is hereby incorporated by reference. The honeycomb core is oriented so that the ribbons forming the cell walls are situated in approximately a toe-to-heel direction. With such an orientation, the thick cell walls, i.e., those made from two ribbons bonded together, are oriented in approximately the toe-to-heel direction. FIG. 1A shows an example of such an orientation. Alternatively, the thicknesses, durometers, and materials of the bottom layer can be different than those specified above. Furthermore, the size, shape, and orientation of cells of the honeycomb core can also differ than those specified above.

Figure 5:
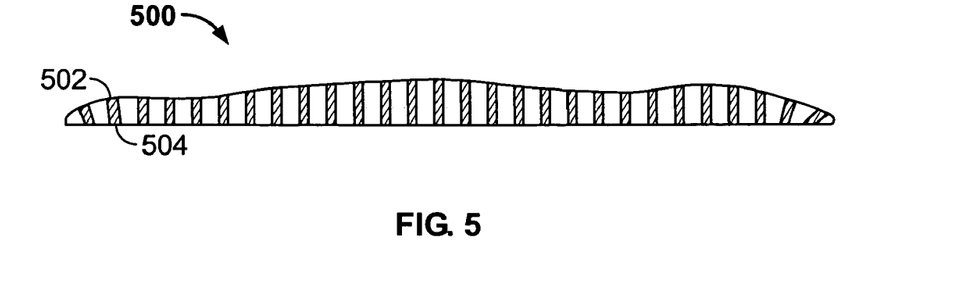
FIG. 5 shows an implementation of the top layer of the sole.

FIG. 5 shows one embodiment 500 of a top layer 104. The top layer shown includes a honeycomb core 502. The honeycomb core 502 is made of 0.008 inch thick core ribbon stock intermittently bonded and expanded to form undulated strips of material that form the honeycomb structure having a plurality of cells. The ribbon stock is 85 shore A durometer. The cell diameters are approximately 3/16 inches. The surfaces of the honeycomb core can be planarized in a process similar to the one described in the '567 patent. Optionally, the surface of the honeycomb core against which the wearer's foot is pressed (i.e., the top surface 502) is planarized to a greater extend than is the surface that will be bonded to the thermoplastic sheet 406 of the bottom layer 400 (i.e., the surface 504). For example, the top surface 502 can be planarized to remove approximately 90/1000 of an inch and the bottom surface 504 can be planarized to remove approximately 30/1000 of an inch. The honeycomb core 502 can be oriented similar to the manner in which the honeycomb core 402 is oriented.

Alternatively, the thicknesses, durometers, and materials of the top layer can be different than those specified above. Furthermore, the size, shape, and orientation of cells of the honeycomb core can also differ than those specified above.

Figure 6:
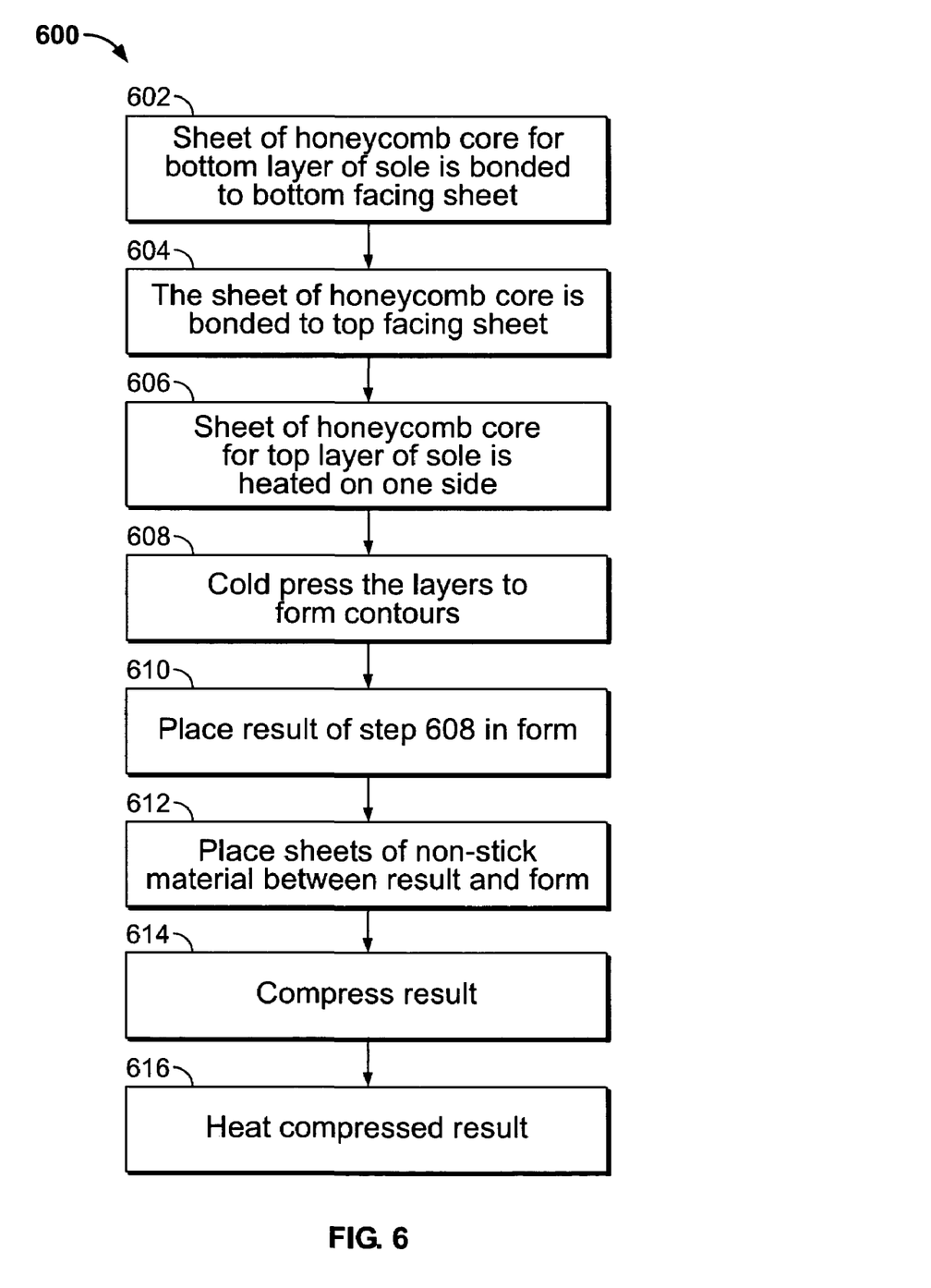
FIG. 6 shows a method of fabricating the sole.

FIG. 6 shows a method 600 for manufacturing the above described dual-layered sole. A sheet of honeycomb core for a bottom layer of a sole, for example, the honeycomb core fabricated as described in the '567 patent, is bonded to a bottom facing sheet, for example, facing sheet 406 (step 602). The bonding process is similar to the one described in the '567 patent.

The sheet of honeycomb core is similarly bonded to a top facing sheet (step 604). Step 604 produces a panel of honeycomb core material (including facing sheets) for the bottom layer.

A sheet of honeycomb core for a top layer of a sole is heated on one side (step 606). The honeycomb core for a top layer can be, for example, one fabricated as described in the '567 patent. The honeycomb core for the top layer can be heated by placing it on a heating plate. In one implementation, the honeycomb core is heated to approximately 435° F. Step 606 is performed so that it is completed at approximately the same time as step 604.

Figure 7A:
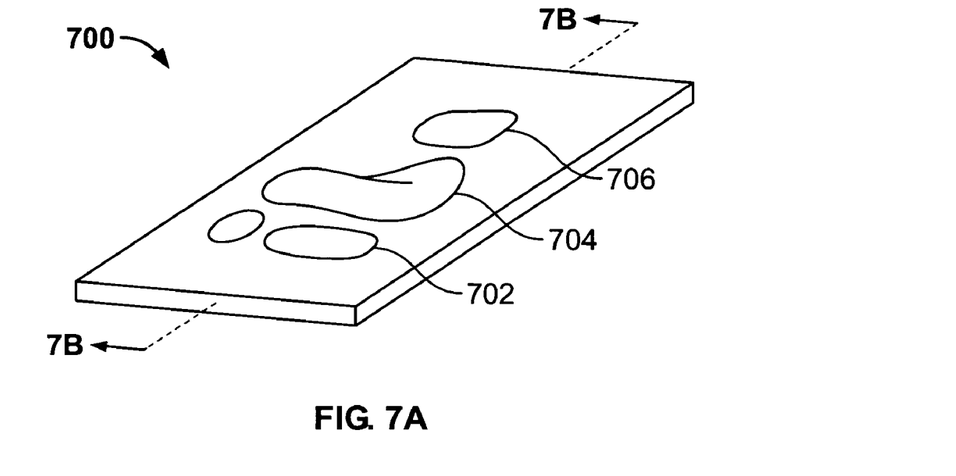
FIGS. 7A and 7B show a male mold for forming contours.
Figure 7B:
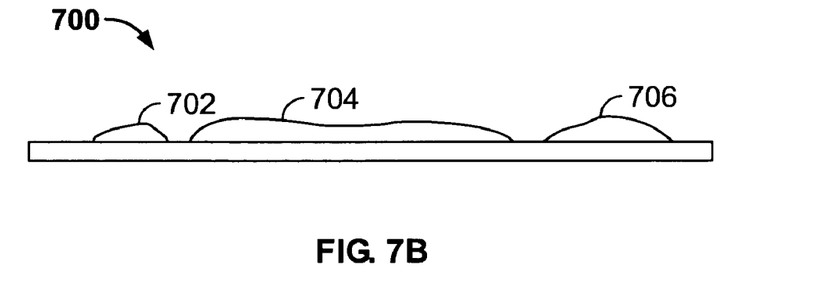

The materials for the top and bottom layers are cold formed together to form contours. Specifically, while they are still hot, the panel of honeycomb material for the bottom layer is placed on a plate (which is usually flat) with its top facing sheet up, the sheet of honeycomb core for the top layer is placed with its hot side contacting the top facing sheet of the bottom layer, and a male mold having a bottom surface shaped like a wearer's foot is pressed against the top surface of the sheet of honeycomb core for a predetermined period, for example, five seconds (step 608). The compression pressure used can be different for different materials. In one implementation, the compression pressure is approximately 3 pounds per square inch. FIGS. 7A and 7B show one example of the male mold 700, which includes protrusions, for example protrusions 702, 704, and 706. The male mold forms contours on the top surface of the sheet of honeycomb core of the top layer, which contours can accommodate the wearer's foot. The male mold 700 is not heated so that the shape of the cells of the honeycomb core of the top layer is not deformed and the smoothness resulting from the above-described planarization is preserved. The mold can be made of a thermally conductive metal that cools quickly.

Figure 8A:
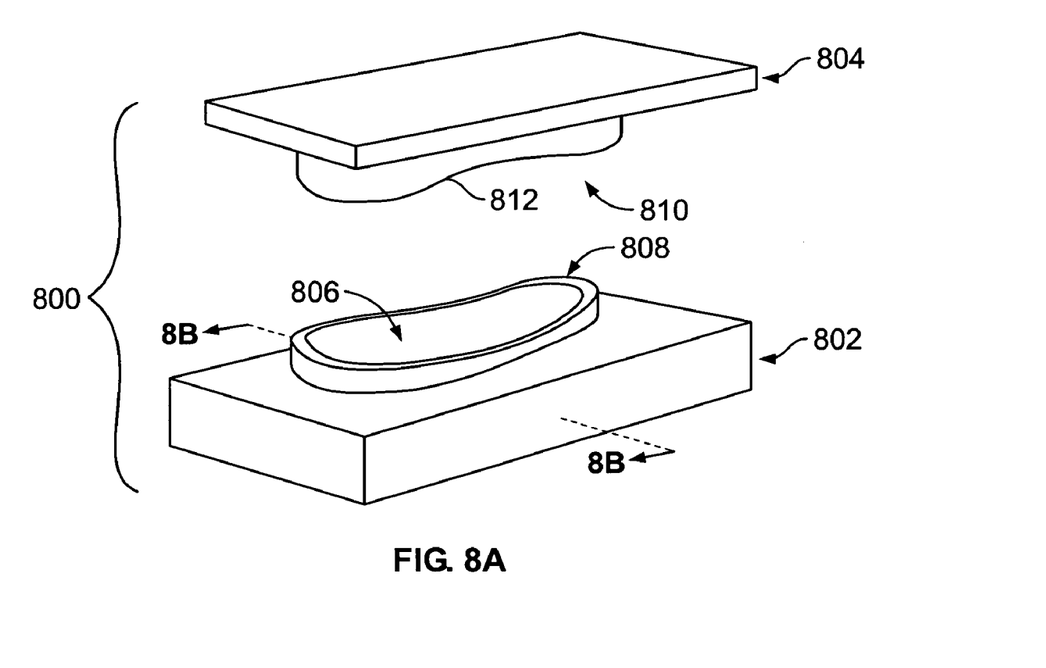
FIGS. 8A and 8B illustrates a form and process of fusing the edge of the sole.

The resulting product of step 608 (i.e., the bonded honeycomb layers) is placed in a form, for example, form 800 of FIG. 8A (step 610). The form 800 is a block of rigid material, for example, stainless steel. Alternatively, the form 800 can be made of other metals. The form 800 can include a first portion 802 and a second portion 804. The first portion 802 includes a cavity 806 and an edge 808. The edge 808 is shaped to define a sole. The bonded honeycomb layers are placed on the form such that the contours of the top layer are aligned within the edge 808. The second portion 804 includes a cavity 810 and edge 812. The latter is shaped like a mirror image of the edge 806. Optionally, sheets of non-stick material, for example, Teflon™ available from E.I. Dupont, are placed between the bonded honeycomb layers and the form 800 (612). The sheets prevent the bonded honeycomb layers from melting and sticking to the form 800. The non-stick material can alternatively be coated directly on surfaces of form 800. Other well known know mold release materials can also be used with or sprayed on form 800.

Figure 8B:
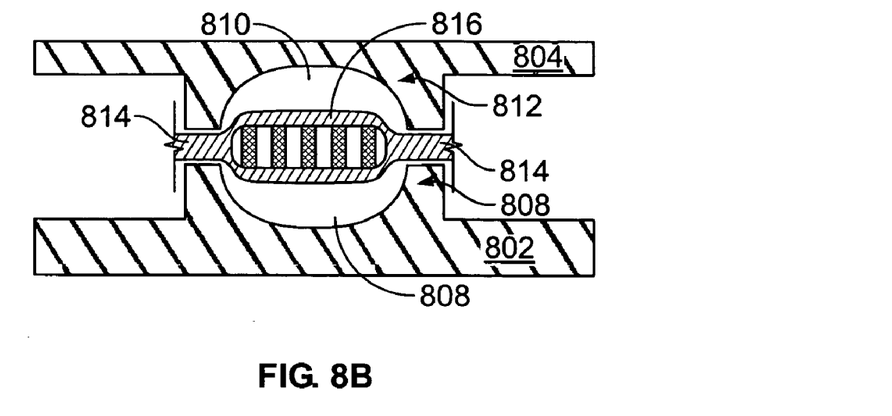

As shown in FIG. 8B, the portions 802 and 804 are then pressed together compressing the panel of honeycomb layers for a predetermined time period, for example, 10 seconds (step 614). The panel of honeycomb layers is heated to, for example, 435° F., which is the predetermined temperature for urethane honeycomb material (step 616). Heating can be performed by using radial frequency waves, in which case the edges are insulated, or by other known heating techniques. Other material may require different temperatures. The combination of the pressure and the heat collapses and fuses together portions 814 of the panel of honeycomb layers sandwiched between edges 808 and 812, while preserving the structure of the portion 816 of the honeycomb material over cavities 806 and 810. The predetermined time period for compression should be just long enough to allow the fusion of the honeycomb materials together. The edges 808 and 812 can include stencils or sharp edges to sever the fused portions 814 from the unfused portion 816, producing a multi-layer sole having structurally intact honeycomb material, properly dimensioned, and with a sealed outer edge (e.g., edge 106 of FIGS. 1A and 1B). Alternatively, the honeycomb panel can be removed, and the fused portions 814 can be trimmed from the unfused portion 816 to result in a properly dimensioned bottom layer of a sole.

Figure 9A:
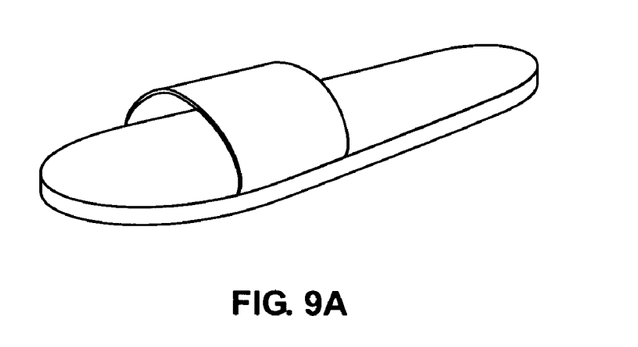
FIG. 9A shows a sandal incorporating the sole.
Figure 9B:
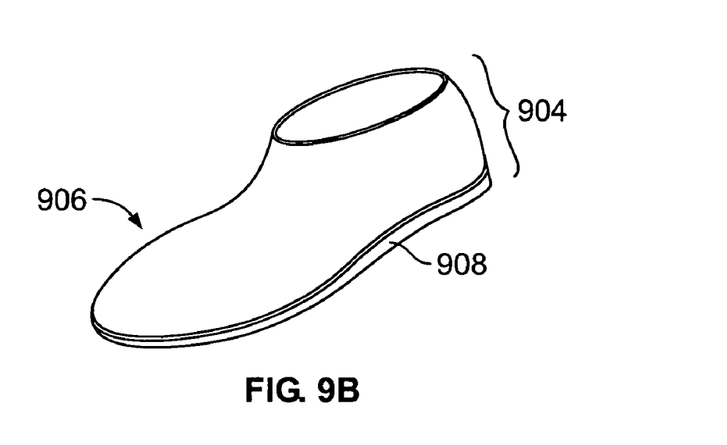
FIG. 9B shows a beach shoe incorporating the sole.

When making a multi-layer sole for footwear that includes portions that cover the wearer's foot, for example, a sandal shown in FIG. 9A, which includes transverse strap 902, the above described method can be changed to include steps in which the strap 902 is attached to the form 800 (inside one of the cavities 808 or 810). The strap 902 is then fused to the edge of the sole during the heat compression steps 614 and 616. In addition to the strap 902, other types of mechanisms for attaching the multi-layer sole to the wearer's foot can be placed inside of cavities 808 and/or 812, and then fused with the edge of the sole during the heat compression steps 614 and 616. For example, the upper portion 904 of the beach shoe 906 shown in FIG. 9B can be placed inside of cavities 808 or 812 and fused with the edge 908. The upper portion can be made from sheets of honeycomb core having any of the characteristics described in the instant specification.

Heating can cause the formation of dimples on the surface of the bottom facing sheet. The depth of these dimples is greater with greater temperatures. Reducing the temperature reduces this dimpling effect, but necessitates a longer press time to properly fuse the honeycomb material compressed between edges 808 and 812. A sufficiently high temperature, for example, 435° F., is selected that produces multi-layer sole relatively quickly, with tolerable dimpling. The dimples can help provide traction with the ground.

The form 800 shown in FIGS. 8A and 8B includes cavities for making one multi-layer sole. However, it can be more efficient to have cavities for making multiple multi-layer soles. The cavities can be nested as close together as possible. This configuration will fuse and cut a plurality of multi-layer soles the same time, while minimizing the amount of the honeycomb panel that is fused outside of the cavities and therefore wasted.

In the above described method, the top facing sheet is not bonded to the honeycomb core of the bottom layer until a point in the footwear fabrication process when the top and bottom layers are to be attached. Alternatively, the top and bottom facing sheets can be bonded to the to the honeycomb core of the bottom layer at the same time. In this case, the steps are synchronized so that step 606 is completed at approximately the same time as when the facings sheets are bonded to the honeycomb core of the bottom layer.

The sole fabricated as described above can be used to make different types of footwear. The sole can be fabricated to have characteristics, for example, softness, rigidity, resiliency, that are appropriate for the footwear. The characteristics of the sole can depend on the type of elastomeric material used, the honeycomb cell shape and size, the thickness of the honeycomb core, and the type of thermoplastic sheets used.

Figure 10A:
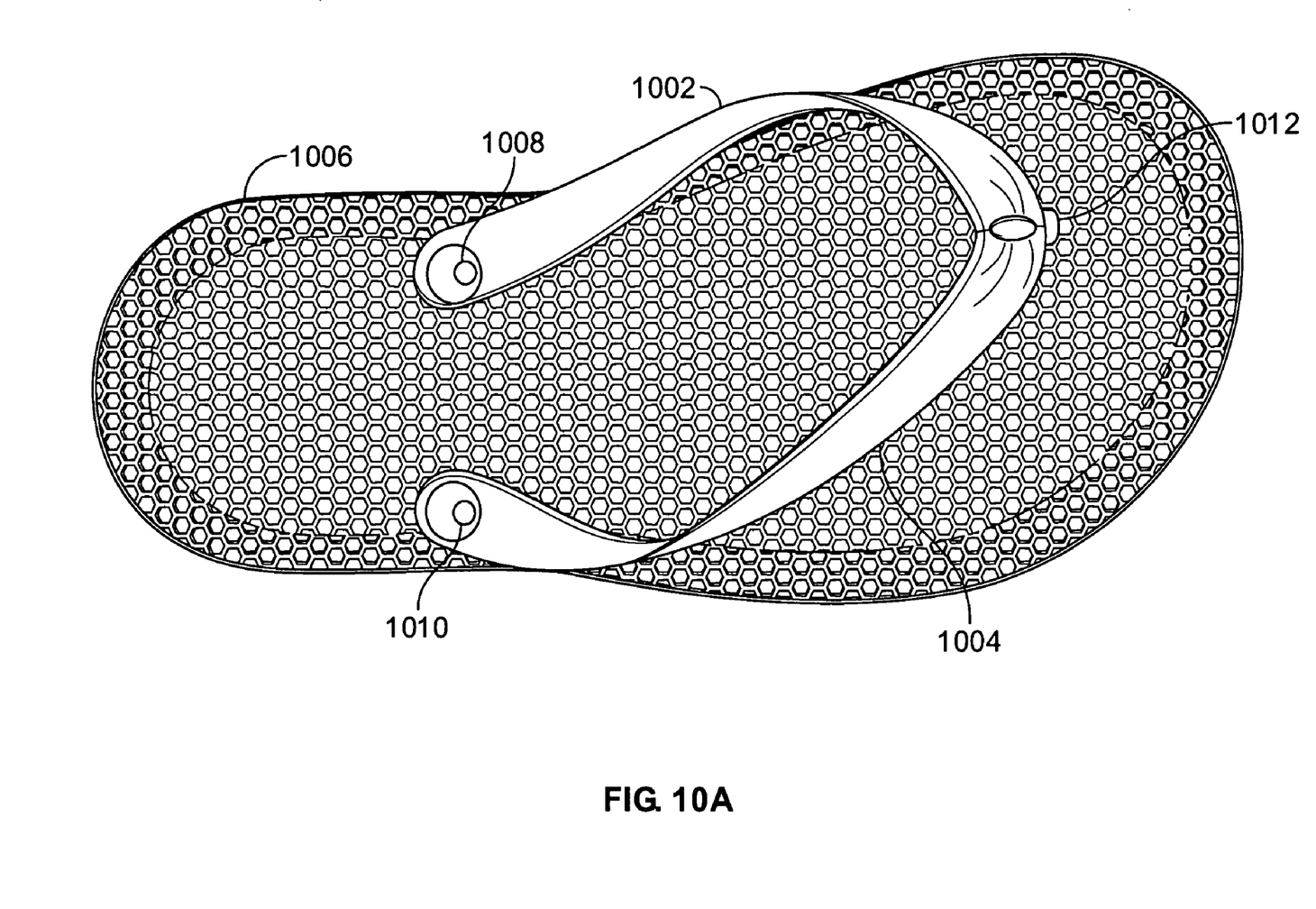
FIGS. 10A–10G show an implementation of a footwear in accordance with the invention.
Figure 10B:
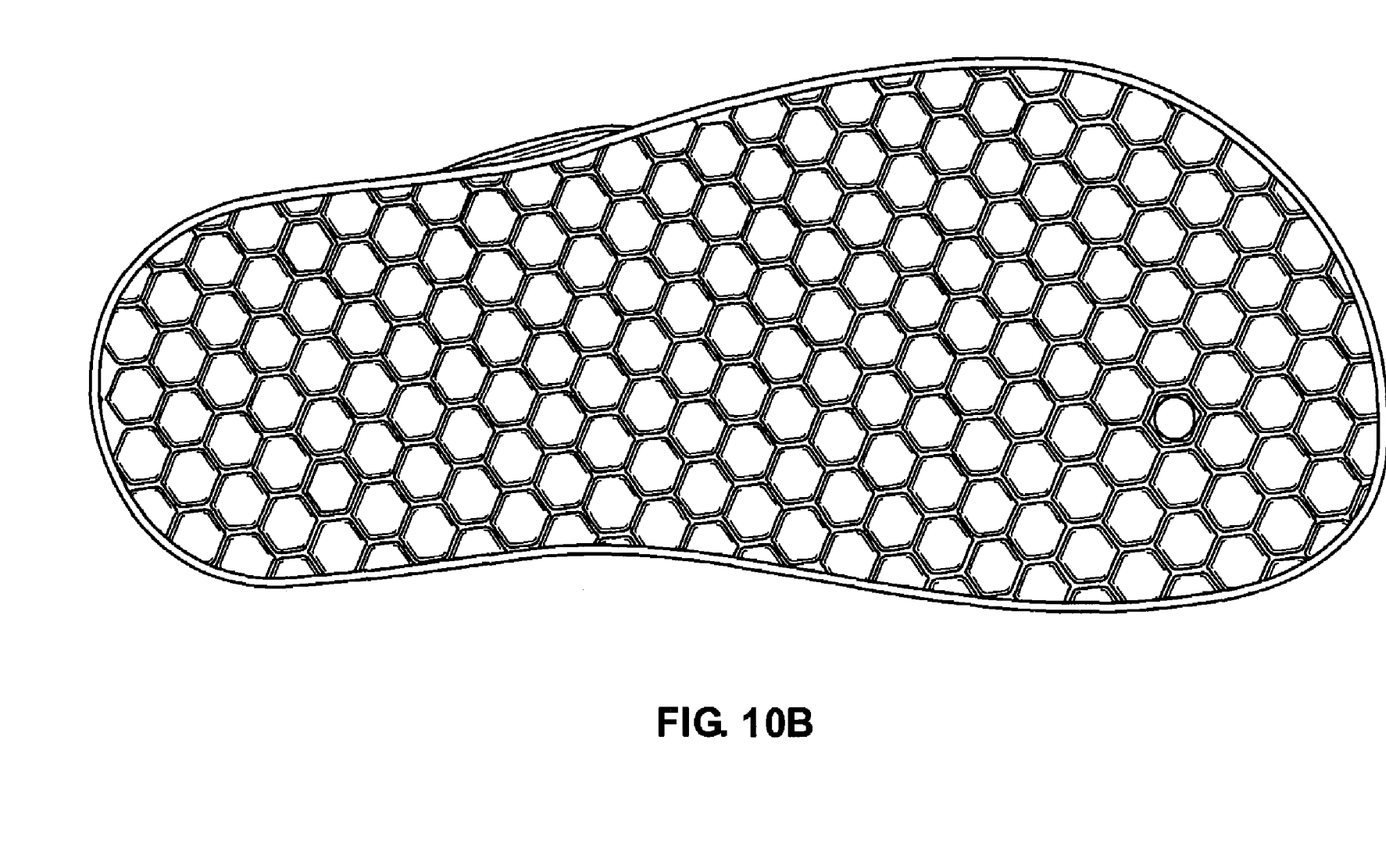
Figure 10C:
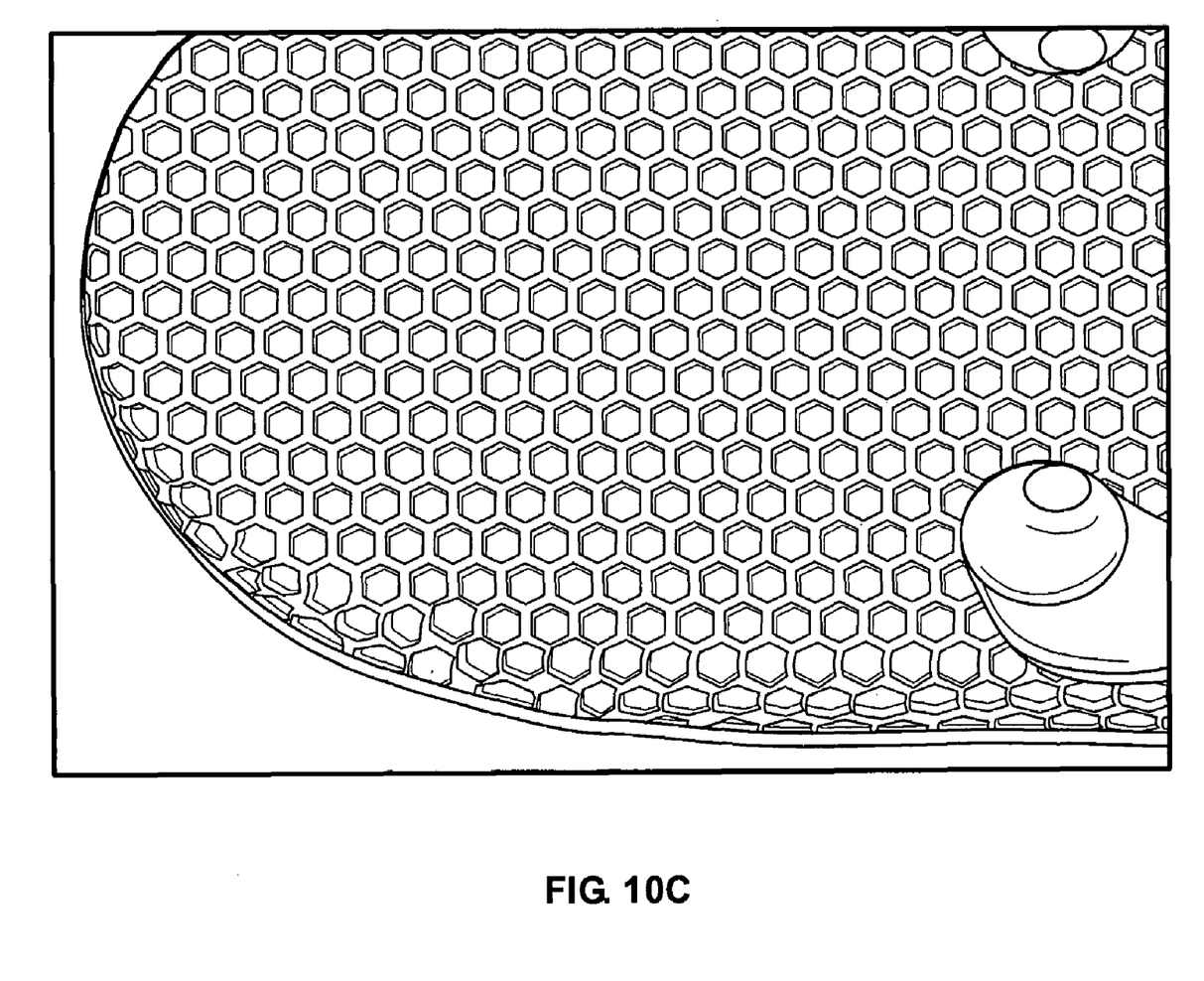
Figure 10D:
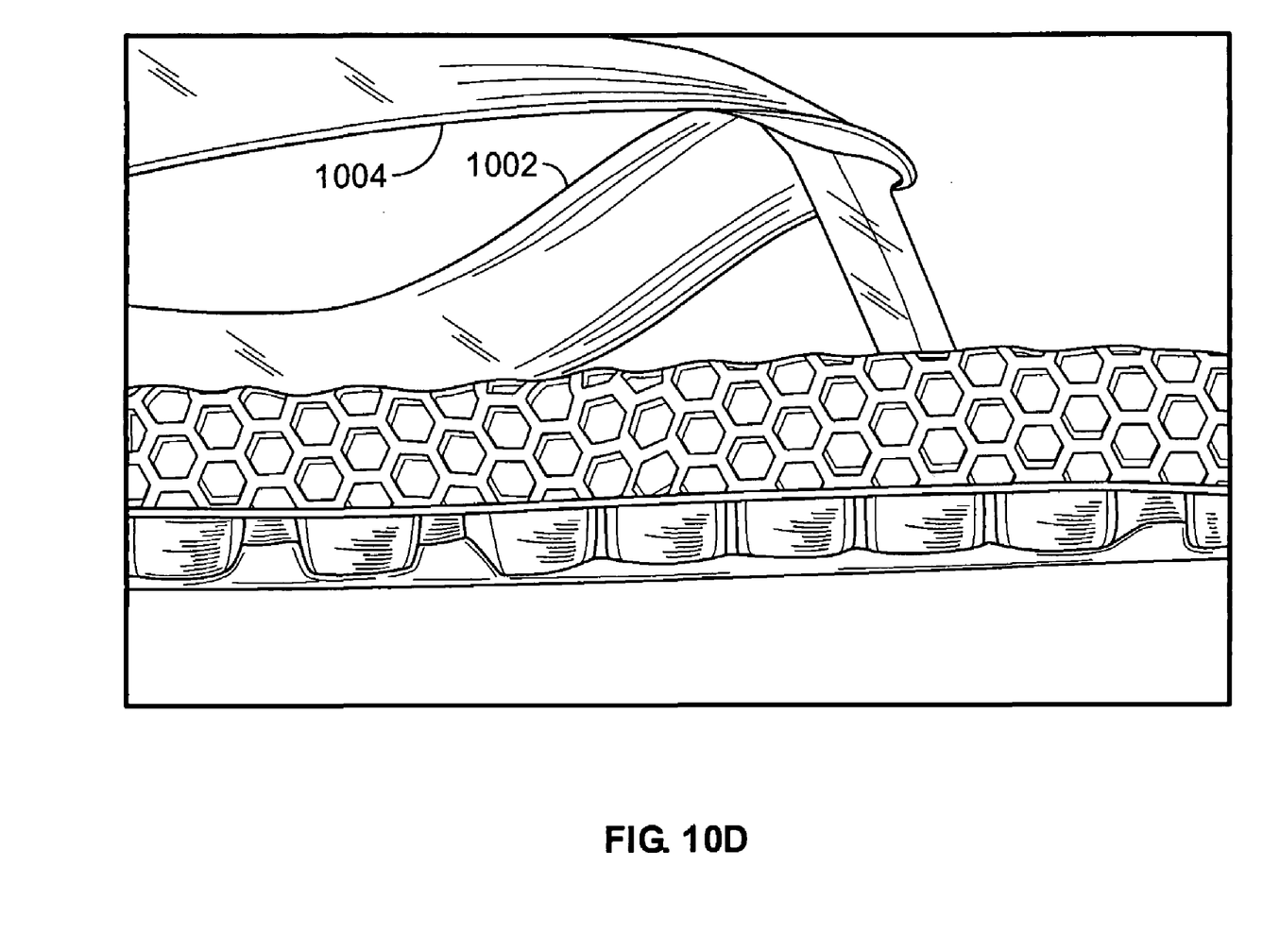
Figure 10E:
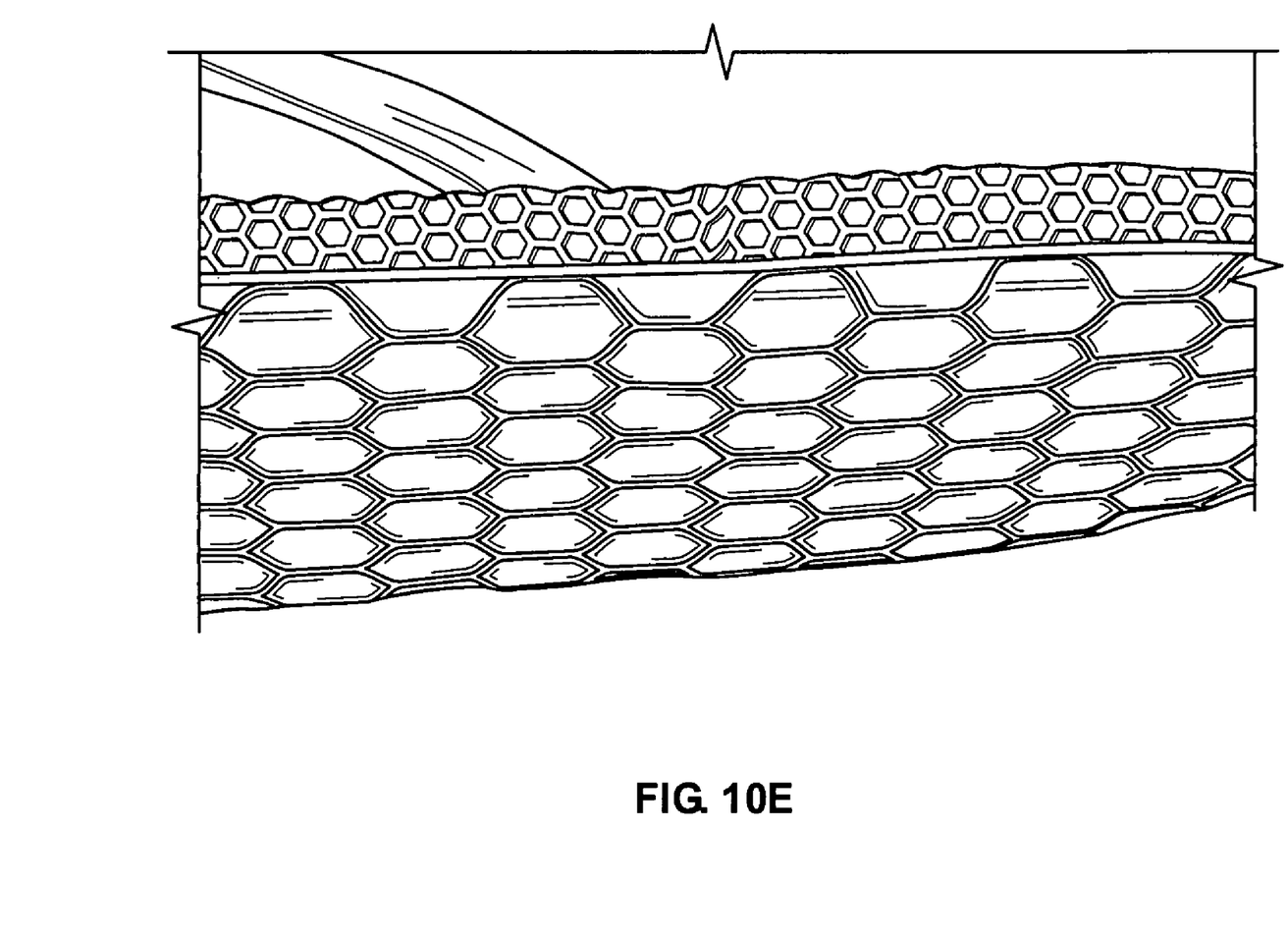
Figure 10F:
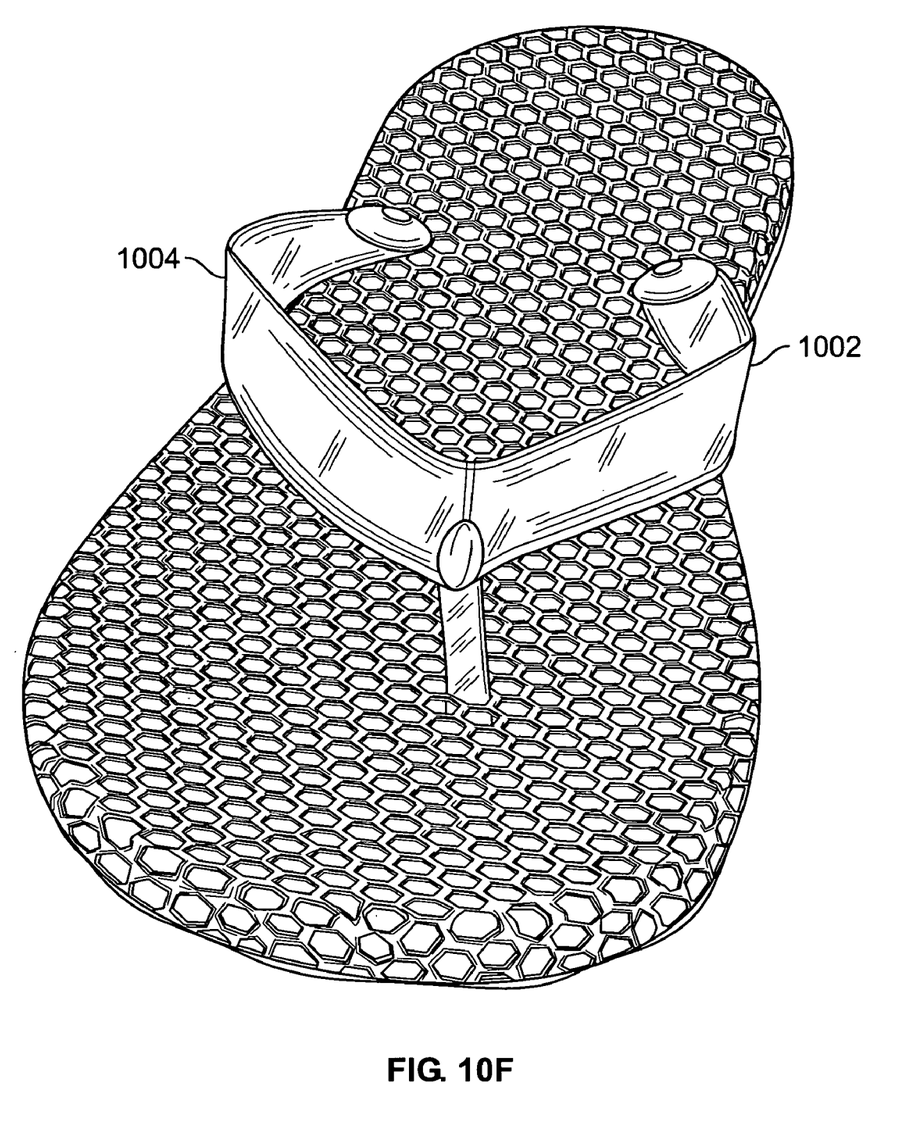
Figure 10G:
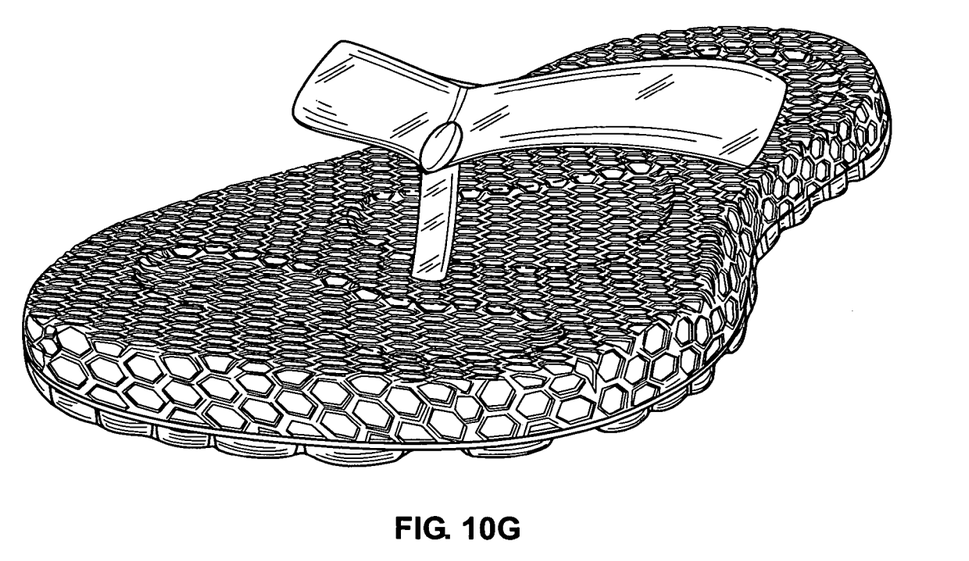

FIGS. 10A–10G show a sandal incorporating the sole described above. The sandal shown is the BuZZbees™ sandal, available from Supracor, Inc. of San Jose Calif., and includes straps 1002 and 1004, attached to the sole 1006 through holes 1008, 1010, and 1012 penetrating the honeycomb core of the top layer and the top facing sheet of the bottom layer. The holes 1008, 1010, and 1012 are situated so that they do not overlap cell walls of the honeycomb core of the bottom layer. That is, the circumference of each hole is within the perimeter of its respective honeycomb cells. Holes thus situated allow the ends of the straps to sit inside their respective honeycomb cells. The holes do not penetrate the bottom facing sheet and, thus, do not provide an avenue for water on the ground to seep into the top of the sole. Optionally, the top layer and bottom layer can be aligned during the above described fabrication process to align cells of the top layer with cells of the bottom layer. Alternatively, other types of fasteners can be used instead of the straps 1002 and 1004. As shown in FIG. 10G, the top surface of the sole includes contours (indicated by broken lines).

An item of foot wear in accordance with the invention includes one or more design features described herein and/or shown in the figures. For example, a sandal can incorporate a multi-layer honeycomb sole that includes a first layer and a second layer. The first layer can include honeycomb core cells that have a first size and the second layer can include honeycomb cells of a second size that is different from the first size. Honeycomb cells in one or both layers can be hexagonal, squared, or some other appropriate shape, or a combination of such shapes. The surface of the top layer can be contoured according to the shape of a foot. Honeycomb cells of the top layer can be unsealed. The first and second layers can be the same or different colors. For example, a top layer can be blue or pink and the bottom layer can be grey. Furthermore, a given layer can include more than one color, more than one cell shape, more than one cell orientation, and/or more than one cell size. Honeycomb cells of the first layer can be oriented in one direction and honeycomb cells of the second layer can be oriented in a different direction, for example, one that is approximately perpendicular to the first direction. An item of footwear can include any combination of the above described design features. The invention therefore includes ornamental designs incorporating one or more of these features.

The invention has been described in terms of particular embodiments. Other embodiments are within the scope of the following claims. For example, the steps of the invention can be performed in a different order and still achieve desirable results. The materials, dimensions, temperatures, and structures specified above provide examples and, furthermore, can be changed to produce a multi-layer sole having the appropriate characteristics. Footwear other than those provided above as examples can incorporate the above described sole.

What is claimed is:

1. A footwear item comprising:
a sole that includes a top layer attached to a bottom layer such that their edges are fused together, the top layer including a first honeycomb core having an exposed surface that includes contours configured to accommodate contours of a foot, the first honeycomb core including unsealed cells that have walls with perforations, the bottom layer including a second honeycomb core that includes sealed cells.

2. The item of claim 1, further comprising:
a middle layer that includes a third honeycomb core that includes sealed cells.

3. The item of claim 1, wherein the footwear item is a sandal.

4. The item of claim 1 wherein:
the first honeycomb core includes cells of a first size; and
the second honeycomb core includes cells of a second size that is larger than the first size.

5. The item of claim 4, wherein:
the cells of the first honeycomb core are approximately half an inch in diameter; and
the cells of the second honeycomb core are approximately one quarter of an inch in diameter.

6. The item of claim 1, wherein:
the exposed surface of the bottom layer includes dimples.

7. The item of claim 1, wherein:
the exposed surface of the bottom layer is contoured to provide traction.

8. The item of claim 1, wherein:
the bottom layer includes a top and a bottom thermoplastic sheet.

9. A sandal having a sole that comprises:
a bottom layer that includes a first honeycomb core, a first thermoplastic sheet bonded to a top surface of the first honeycomb core, and a second thermoplastic sheet bonded to a bottom surface of the first honeycomb core, wherein cells of the first honeycomb core are sealed by the first and second thermoplastic sheets to trap fluid within each cell; and
a top layer that includes a second honeycomb core that includes an exposed surface that is contoured according to contours of a foot, the second honeycomb core includes cells that are not sealed and, furthermore, having walls with perforations such that fluids can be expelled from the cells when the sandal is subject to a compressive force applied at the exposed surface;
wherein the top and bottom layer are attached such that their edges are fused together.

* * * * *